United States Patent [19]

Matjukhina et al.

[11] Patent Number: 5,006,776
[45] Date of Patent: Apr. 9, 1991

[54] GATE-CONTROLLED ELECTRIC DRIVE

[75] Inventors: Ljudmila I. Matjukhina; Alexandr S. Mikhalev; Sergei N. Sidoruk; Igor M. Chushenkov, all of Minsk, U.S.S.R.

[73] Assignee: Belorussky Gosudarstvenny Universitet Imeni V.I. Lenina, Minsk, U.S.S.R.

[21] Appl. No.: 360,938
[22] PCT Filed: May 14, 1987
[86] PCT No.: PCT/SU87/00057
§ 371 Date: Jan. 17, 1989
§ 102(e) Date: Jan. 17, 1989
[87] PCT Pub. No.: WO88/09082
PCT Pub. Date: Nov. 17, 1988

[51] Int. Cl.$^5$ .............................................. H02P 5/34
[52] U.S. Cl. .................... 318/723; 318/254; 318/705
[58] Field of Search ........ 318/712, 714, 715, 716–719, 318/720–721, 723, 724, 254, 798, 806–807, 811; 358/804–805, 811–812, 814, 819–820, 831–832, 904

[56] References Cited

U.S. PATENT DOCUMENTS

| | | | |
|---|---|---|---|
| 3,531,702 | 9/1970 | Hill | 318/138 |
| 4,099,109 | 10/1976 | Abbondanti | 318/722 X |
| 4,292,577 | 9/1981 | Cesarz et al. | 318/723 X |
| 4,296,362 | 10/1981 | Beasley | 318/138 |
| 4,316,132 | 2/1982 | Geppart | 318/721 X |
| 4,357,569 | 11/1982 | Iwakane et al. | 318/721 |
| 4,409,534 | 10/1983 | Bose | 318/723 X |
| 4,447,771 | 5/1984 | Whited | 318/715 X |
| 4,490,661 | 12/1984 | Brown et al. | 318/661 |
| 4,625,158 | 11/1986 | Taenzer | 318/685 X |
| 4,703,245 | 10/1987 | Sakamoto et al. | 318/798 X |
| 4,761,599 | 8/1988 | Yasunobu et al. | 318/723 |

Primary Examiner—William M. Shoop, Jr.
Assistant Examiner—David Martin
Attorney, Agent, or Firm—Lilling and Lilling

[57] ABSTRACT

A gate-controlled electric drive comprises a synchronous motor (2) having m windings (2) and provided with a shaft position transducer whose output is connected to an address input of a permanent memory. The outputs for setting a pulse width code of said permanent memory are connected to inputs of pulse-width modulators, while outputs for setting a polarity code of said permanent memory are connected to inputs of a reverser. The outputs of the pulse-width modulators are connected to control inputs of corresponding control units, whereas inputs for setting polarity of the control units are connected to outputs of the reverser. The outputs of each control unit are connected to inputs of a respective switching unit based on bidirectional switches connected in a bridge circuit, a switching unit being connected to the respective winding of the synchronous motor. A timer (67) is connected to the control units and to an m-phase transformer whose output windings are connected directly to power inputs of the respective switching units.

7 Claims, 5 Drawing Sheets

GATE-CONTROLLED ELECTRIC DRIVE

FIELD OF THE INVENTION

The present invention relates to electrical machines and, more particularly, to a gate-controlled electric drive.

DESCRIPTION OF THE PRIOR ART

The gate-controlled electric drive has recently found wide application. However, these electric drives are fed from a.c. mains or from a d.c. power source and comprise a complex power system with rectifiers and filters. When such devices are included into the circuit of a gate-controlled electric drive, they increase the weight, dimensions and cost of this drive and, at the same time, reduce its reliability and efficiency.

Known in the art is a gate-controlled electric drive (SU, A, 1144201) comprising a synchronous motor having windings connected to the output of a polyphase controlled transforming unit; a phase inverter which is mechanically connected to the shaft of the synchronous motor, the polyphase winding of said inverter being connected to a polyphase sine wave voltage source; a phase-shifting unit; a phase difference measuring unit; a controlled pulse generator and a permanent memory.

This prior art gate-controlled electric drive is designed for connection to a.c. power mains and is equipped with a complex control system. When a gate-controlled electric drive is supplied from a.c. mains it must include a rectifier and a filter, which reduce its reliability and efficiency, increase the cost, weight and overal dimensions.

Also known in the art is a gate-controlled electric drive (SU, A, 1244779) comprising a synchronous motor with m windings, a short position transducer whose output is connected to the address input of a fixed memory storing codes of width and polarities of power supply pulses fed to the windings of the synchronous motor, the m outputs for setting a pulse width code of said fixed memory being connected to the inputs of m pulse-width modulators. The complementing input of each pulse-width modulator is connected to the output of a controlled-frequency divider whose control input receives a control signal modulus code, while the complementing input is connected to a pulse generator. $(m-1)$ outputs for a polarity setting code of the fixed memory are connected to $(m-1)$ inputs of a reverser whose control input receives a a control signal polarity code. There are m control units, and the control input of each control unit is connected to the output of the corresponding pulse-width modulator, while the polarity setting inputs of the $(m-1)$ control units are connected to the $(m-1)$ reverser outputs. The outputs of each control unit are connected to the inputs of a corresponding switching unit whose output is connected to a corresponding winding of the synchronous motor; an m-phase transformer is connected to m-phase a.c. supply mains, the output windings of said transformer being connected to the power inputs of the corresponding switching units.

The output windings of the m-phase transformer are connected to the m-phase rectifier whose output is connected to a filter whose output is connected to the power inputs of the switching circuits built around unidirectional solid-state switches.

The reverser also comprises $(m-1)$ inputs connected respectively to the corresponding outputs of the pulse-width modulators and $(m-1)$ outputs connected to the corresponding control inputs of the control units.

In this case the mth code presetting output of the fixed memory is connected to the polarity setting input of the corresponding control unit.

Formation of a required perpendicular orientation of the magnetic fields of the stator and rotor of the synchronous motor, at which maximum torque is obtained, in the prior art electric drive is effected by rectifying the a.c. supply voltage, smoothing the ripples by a filter and subjecting the output voltage to pulse-width modulation through a switching circuit.

The reverser used in this drive is complex since it is based on $(2m-2)$ multiplexers, in which case the reverse of the drive is accompanied by chaotic changes of the torque due to disturbance of mutual orientation of the magnetic fields of the stator and rotor of the synchronous motor when reversing the drive.

The use of unidirectional solid-state switches in the switching circuit does not allow these switches to be used also for rectifying the phase voltage so that it is necessary to use a rectifier for this purpose, and this complicates the design.

Thus, the prior art gate-controlled electric drive supplied from a.c. mains is characterized by a complex design due to the presence of an m-phase rectifier and a filter, which reduce the efficiency and reliability and increase the weight, overall dimensions and cost of the electric drive.

SUMMARY OF THE INVENTION

The object of the invention is to provide a gate-controlled electric drive in which magnetic fields of the stator and rotor of the synchronous machine are oriented by way of combining two functions in one switching unit: rectification and pulse-width modulation of phase voltages in the supply line.

This object is attained by providing a gate-controlled electric drive having a synchronous motor with m windings and a shaft position detector whose output is connected to the address input of a fixed memory storing width and polarity codes of power supply pulses fed to the windings of the synchronous motor, the m outputs for setting a pulse width code of said fixed memory being connected to the inputs of m pulse-width modulators. The complementing input of each pulse-width modulator is connected to the output of a controlled-frequency divider whose control input receives the control signal modulus code, while the complementing input is connected to a pulse generator. $(m-1)$ outputs for a polarity setting code of the fixed memory are connected to $(m-1)$ inputs of a reverser whose control input receives a control signal polarity code. There are m control units and the control input of each control unit is connected to the output of the corresponding pulse-width modulator, while the polarity setting inputs of the $(m-1)$ control units are connected to the $(m-1)$ outputs of the reverser. The outputs of each control unit are connected to the inputs of a corresponding switching unit whose output is connected to a corresponding winding of the synchronous motor. A m-phase transformer is connected to m-phase a.c. supply mains, the output windings of said transformer being connected to the power inputs of the corresponding switching units. A timer is connected to the m-phase transformer and m control units. The mth input of the reverser is connected respectively to the mth polarity setting output of the fixed memory, while the output windings of the m-phase transformer are connected to the power inputs of corresponding switching units of corresponding switching units based on bidirectional solid-state switches connected in a bridge circuit.

It is preferable that the reverser includes m "exclusive OR" elements whose first inputs and outputs are respectively m inputs and m outputs of the reverser, while the second inputs are interconnected and used as a control input of the reverser.

It is also preferable that the timer comprises m comparators the first inputs of which are connected directly to the corresponding output windings of the m-phase transformer, while the second inputs are grounded. In this case each control unit comprises three "exclusive OR" elements, the first input of the first element is at the same time a control input of the control unit, the second input is connected to the first input of the second "exclusive OR" element, which is a polarity setting input of the control unit, while the output of the second "exclusive OR" element is connected to the first input of the switching unit. The output of the first "exclusive OR" element is connected to the first input of the third "exclusive OR" element whose second input is connected to the second input of the second "exclusive OR" element, which, at the same time, is a polarity correction input of the control unit and is connected to the output of the corresponding comparator of the timer. Each control unit also comprises two inverters, the input of the first of which being connected to the output of the second "exclusive OR" element and the output being connected to the second input of the switching unit. The output of the third "exclusive OR" element is connected to the input of the second inverter and to the third input of the switching unit, and output of the second inverter is connected to the fourth input of the switching unit.

It is preferable that the timer comprises a comparator whose first input is connected to one of the output windings of the m-phase transformer, while the second input is grounded, a counter whose reset input is connected to the comparator output, and a pulse generator connected to the complementing input of the counter whose output is an output of the timer. The fixed memory is provided with an additional address input connected to the output of the counter of the timer. Each control unit comprises an "exclusive OR" element whose first input is at the same time a control input of the control unit, and two inverters, the input of the first of which is connected to the second input of the "exclusive OR" element and is at the same time a polarity setting input of the control unit, which is connected to the fourth input of the switching unit. The output of the first inverter is a third input of the switching unit. The input of the second inverter is connected to the output of the "exclusive OR" element which is at the same time a second input of the switching unit, while the output of the second inverter is a first input of the switching unit. The input of the second inverter is connected to the output of the "exclusive OR" element which is at the same time a second input of the switching unit, the output of the second inverter being a first input of the switching unit.

It is also preferable that each bidirectional solid-state switch comprises a metal-insulator-semiconductor transistor with an n-type induced channel whose drain and source are terminals of this switch. A first resistor is connected to the substrate and gate of the metal-insulator-semiconductor transistor. A zener diode has its cathode connected to the gate and the anode is connected to the substrate of the metal-insulator-semiconductor transistor. A first diode and a second diode have anodes connected to the substrate while the cathodes are connected respectively to the drain and source of the metal-insulator-semiconductor transistor. A second resistor is connected in parallel to the first diode, and a third resistor is connected in parallel to the second diode. A third diode has its cathode connected to the gate of the metal-insulator-semiconductor transistor. A bipolar n-p-n transistor has its collector connected to the anode of the third diode while the emitter is connected to a negative-polarity d.c. voltage source. A fourth resistor is connected to the collector of the n-p-n transistor and to a first positive-polarity d.c. voltage source. A bipolar p-n-p transistor has its emitter connected to a second positive-polarity d.c. voltage source. Fifth and sixth resistors are connected respectively to the collector of the p-n-p transistor, the base and emitter of the n-p-n transistor. A seventh resistor has a first output connected to the base of the p-n-p transistor, while the second output is a corresponding input of the switching unit.

The claimed gate-controlled electric drive can be connected directly to a.c. mains since its switching unit is based on bidirectional solid-state switches enabling this unit to be used both as a switching system and a rectifier thus eliminating the need in a separate rectifier and a filter in the drive system thereby reducing the cost, weight and dimensions and increasing the efficiency and reliability of the electric drive.

Direct power supply from a.c. mains without a filter does not result in higher torque fluctuation of the synchronous motor, and this makes it possible to use this drive in low-inertia synchronous motors with strict requirements to the level of the torque fluctuation, weight, overal dimensions and energy consumption of the electric drive.

The simplification of the power part of the drive is obtained at the expense of some sophistication of the weak-current part and this generally reduces the energy consumption and cost of the drive because the weak-current components are cheaper and consume just a small fraction of the total input power of the drive.

BRIEF DESCRIPTION OF THE DRAWINGS

The invention is further described by way of examples with reference to the accompanying drawings, in which.

DETAILED DESCRIPTION OF THE INVENTION

Figure 1:
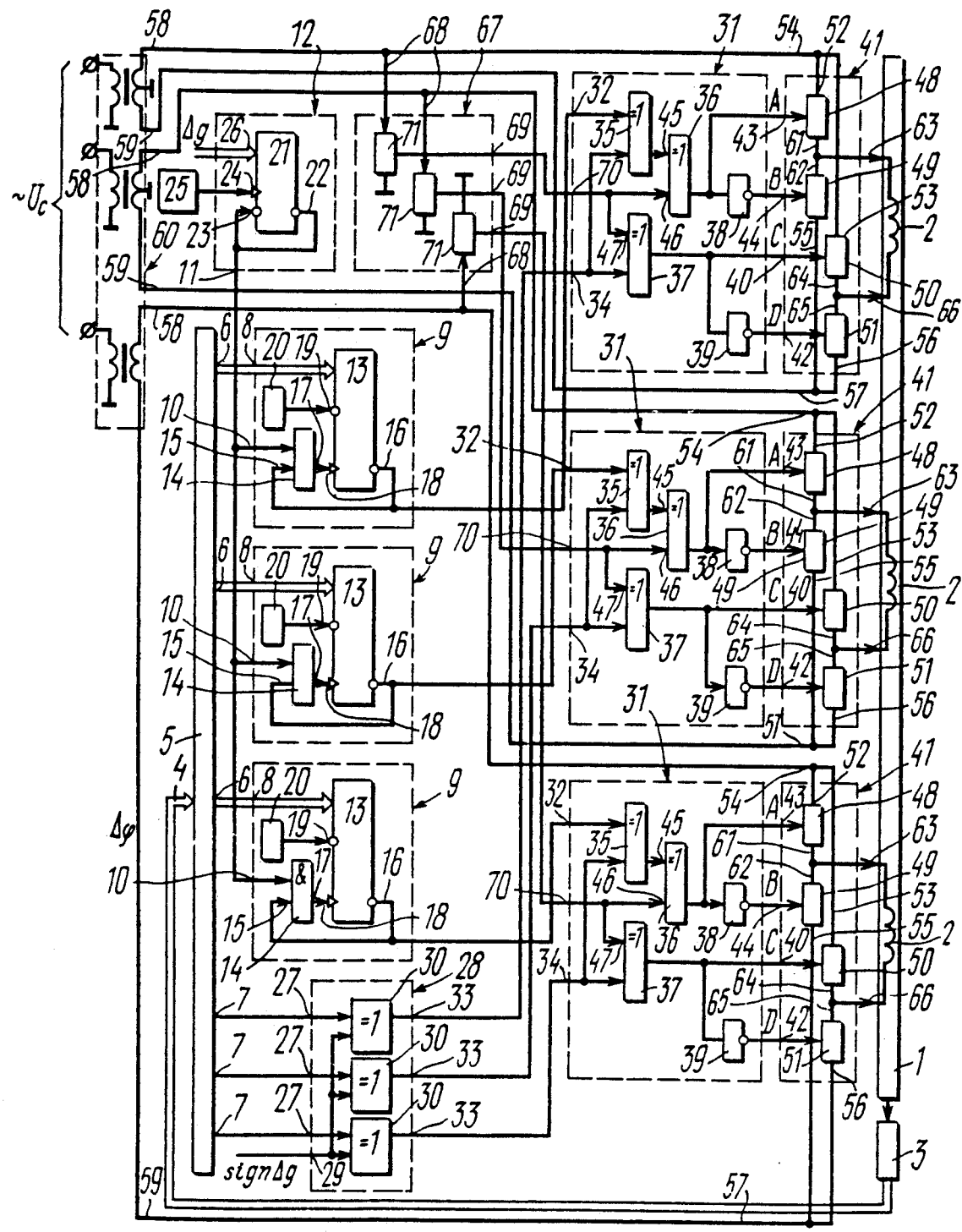
FIG. 1 shows a block diagram of the gate-controlled electric drive.

The gate-controlled electric drive comprises a synchronous motor 1 (FIG. 1) with m windings 2, (in this embodiment with three windings 2, m=3, which corresponds to power supply from three-phase mains) provided with a shaft position transducer 3, which may be made in the form of a digital code counter producing at its output a code Δ 4. The shaft position transducer 3 is connected to the address input of a fixed memory 5 storing width and polarity codes of power supply pulses of the windings 2 of the synchronous motor 1. The fixed memory 5 has three outputs 6 for setting a width code and three outputs 7 for setting a Polarity code. The width code setting outputs 6 are connected to inputs 8 of the pulse-width modulators 9, each modulator having a complementing input 10 connected to the output 11 of a controlled frequency divider 12.

Each pulse-width modulator 9 in the embodiment under discussion comprises a substract binary counter 13 whose code input is the input 8 of the pulse-width modulator 9, and a two-input AND element 14 whose first input is the complementing input 10 of the pulse-width modulator 9 and whose second input 15 is connected to an output 16 of the counter 13, which is an output of the pulse-width modulator 9. The output 17 of the two-input AND element 14 is connected to the substract input 18 of the counter 13 whose recording input 19 is connected to the output of a pulse generator 20.

In this embodiment the controlled frequency divider 12 comprises a substract binary counter 21 whose borrow output 22 is connected to a recording input 23 and is an output 11 of the controlled frequency divider 12. The substract input of the substract binary counter 21 is a complementing input 24 of the controlled frequency divider 12, which is connected to a pulse generator 25. The code input of the counter 21 is a control input 26 of the controlled frequency divider 12 receiving the modulus code Δg of the control signal.

The polarity setting code outputs 7 of the fixed memory 5 are connected to inputs 27 of a reverser 28 whose control input 29 receives a code sign Δg of control signal polarity. The reverser 28 comprises three "exclusive OR" elements 30 whose first inputs are at the same time inputs 27 of the reverser 28, while the second inputs are interconnected and used as the control input 29 of the reverser 28.

The gate-controlled electric drive comprises three control units 31, the control input 32 of each of these units being connected to the output of the corresponding pulse-width modulator 9: the outputs 33 of the reverser 28 are connected to the polarity setting inputs 34 of the corresponding control units 31.

In the embodiment under discussion each control unit 31 comprises three "exclusive OR" elements 35, 36, 37 and two inverters 38, 39. The first input of the "exclusive OR" elements 35 is at the same time the control input 32 of the control unit 31: the second input of the "exclusive OR" element 35 is combined with the first input of the "exclusive OR" element 37 and is at the same time the polarity setting input 34 of the control unit 31. The output of the "exclusive OR" element 37 is connected to an input 40 of a corresponding switching unit 41 and to the input of an inverter 39 whose output is connected to the input 42 of the switching unit 41 whose input 43 is connected to the output of the "exclusive OR" element 36 and to the input of the inverter 38 whose output is connected to the input 44 of the switching unit 41. The output of the "exclusive OR" element 35 is connected to the input 45 of the "exclusive OR" element 36 whose input 46 is connected to the input 47 of the "exclusive OR" element 37.

Each switching unit 41 is based on bidirectional solid-state switches and in the embodiment under discussion comprises four switching elements 48, 49, 50, 51 connected in a bridge circuit. The terminals 52, 53 of the switching elements 48, 50 are interconnected and form a single power input 54 of the switching unit 41; the terminals 55, 56 of the switching elements 49, 51 are connected to each other and form another power input 57 of the switching unit 41. The power inputs 54, 57 of each switching unit 41 are directly connected to the terminals 58, 59 of the corresponding output windings of a three-phase transformer 60, the center taps of the windings being grounded, and the primary windings of the transformer 60 being connected to three-phase a.c. mains (connection of the primary windings to the mains is conditionally shown in the drawing as $V_c$).

The terminals 61, 62 of the corresponding switching elements 48, 49 are connected to each other and to the terminal 63 of the winding 2 of the synchronous motor 1, while the terminals 64, 65 of the corresponding switching elements 50, 51 are connected to the terminal 66 of the winding 2 of the synchronous motor 1.

The gate-controlled electric drive comprises a timer 67 electrically connected to the three-phase transformer 60 and to the control units. In the embodiment under discussion the inputs 68 of the timer 67 are connected to the terminals 58 of the transformer 60, while the outputs 69 are connected to the polarity correction units 70 of the corresponding control unit 31. The timer 67 comprises three comparators 71 whose first inputs are at the same time inputs 68 of the timer 67, the second inputs are grounded while the outputs are connected to the polarity correction inputs 70 of the control unit 31.

The above described embodiment of the gate-controlled electric drive has no means for compensation of the torque fluctuation due to direct connection of the drive to the mains. Such an electric drive is usually provided with a high-inertia synchronous motor.

Figure 2:
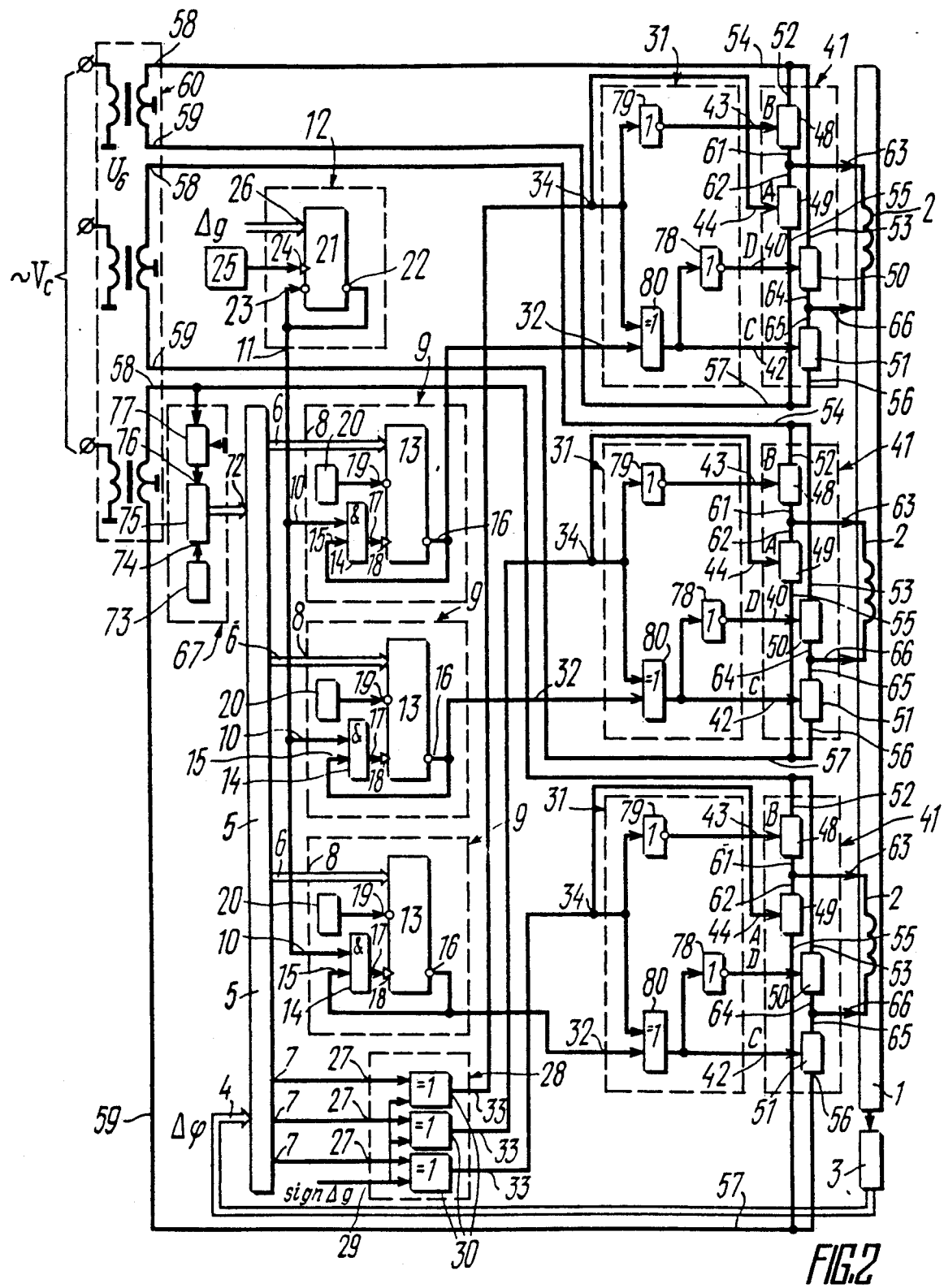
FIG. 2 is a block diagram of the gate-controlled electric drive with another embodiment of the control units and the timer, according to the invention.

In the case of a low-inertia synchronous motor it is reasonable to employ another embodiment of the gate-controlled electric drive shown in FIG. 2, in which the pulse-width modulators 9, the reverser 28, the controlled frequency divider 12 and the switching units 41 are made as described above.

In this embodiment the fixed memory 5 (FIG. 2) has an additional address input 72 connected to the timer 67, which includes a pulse generator 73 connected to the complementing input 74 of a summary binary counter 75 whose reset input 76 is connected to the output of a comparator 77 whose first input is connected to the terminal 58 of one winding of the three-phase transformer 60, while the other input is grounded.

Each control unit 31 comprises inverters 78, 79 and an "exclusive OR" element 80 whose input is a control input 32 of the control unit 31, while the other input is connected to the input of the inverter 79 and is at the same time a polarity setting input 34 of the control unit 31, which is connected to the input 44 of the switching unit 41. The output of the inverter 79 is connected to the input 43 of the switching unit 41, while the output of the inverter 78 is connected to its input 40.

The output of the "exclusive OR" element 80 is connected to the input 42 of the switching unit 41 and to the input of the inverter 78.

Figure 3:
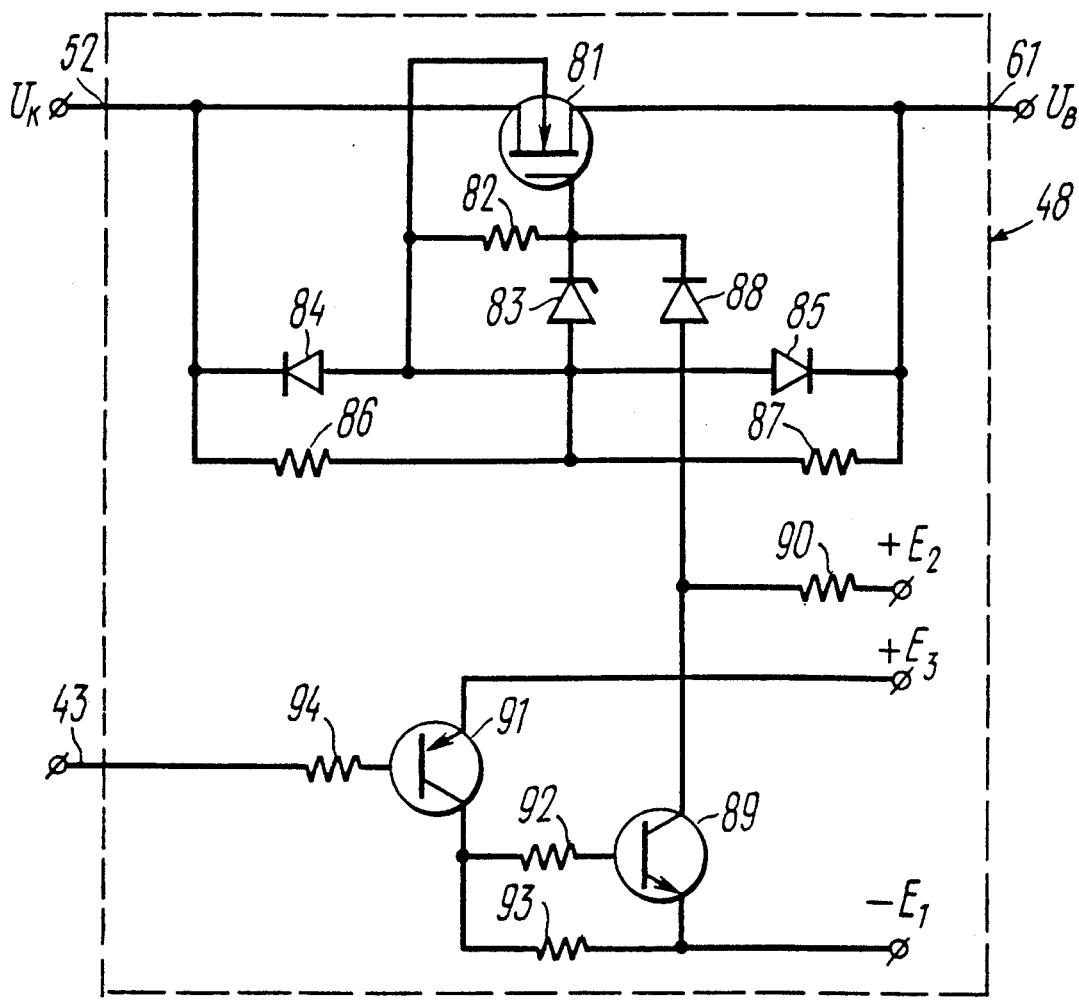
FIG. 3 is a schematic diagram of the switching unit with bilateral conductivity, according to the invention.

The bidirectional switching elements 48, 49, 50, 51 (FIGS. 1, 2) are identical in each switching unit 41. Let us consider for example, a schematic diagram of the switching circuit 48 which includes a metal-insulator-semiconductor (MIS) transistor 81 (FIG. 3) with an n-type induced channel whose drain and source are terminals 52, 61 of the switching circuit 48, a resistor 82 connected to the substrate and gate of the MIS transistor 81. The cathode of a zener diode 83 is connected to the gate while the anode is connected to the substrate of the MIS transistor whose drain and source are connected respectively to the cathodes of diodes 84, 85 whose anodes are connected to the substrate of the MIS transistor 81.

The resistors 86, 87 are connected in parallel to the diodes 84, 85, the cathode of the diode 88 is connected to the gate of the MIS transistor 81, while its anode is connected to the collector of a bipolar n-p-n transistor 89, the emitter of which is connected to a negative-polarity d.c. voltage source $-E_1$. A resistor 90 is connected to the collector of the n-p-n transsistor 89 and to a first positive-polarity d.c. voltage source $E_2$, the emitter of a bipolar p-n-p transistor 91 being connected to a second positive polarity voltage source $E_3$. Resistors 92, 93 are connected respectively to the collector of the p-n-p transistor 91, and to the base and emitter of the n-p-n transistor 89. The first terminal of a resistor 94 is connected to the base of the p-n-p transistor 91, while the second terminal is an input 43 of the switching circuit 48, which at the same time, is a corresponding input of the switching unit 41.

The claimed gate-controlled electric drive operates as follows.

A preset value of the torque of the synchronous motor 1 $\phi_s$ (FIG. 1) is established by controlling the amplitude of the vector of the magnetic field of the stator of the synchronous motor 1, the mean period of power supply being characterized by perpendicularity of the vectors $\phi_s$ and $\phi_r$ of the magnetic fields of the stator and rotor of the synchronous motor 1. This is attained by generating a mean voltage $V_i$ of the ith stator winding 2 of the synchronous motor 1 by the law:

$$V_i = \frac{\Delta g \cdot V_m}{2^n - 1} \sin\left(\frac{\Delta\phi}{2^d} 2\pi + \frac{2}{3}\pi i\right) \quad (1)$$

where
$\Delta g$ is the code of control signal modulus;
$V_m$ is the effective value of the voltage on the terminals 58 of the secondary vindings of the three-phase transformer 60;
n is the capacity of the controlled frequency divider 12;
$\Delta\phi$, d are the output code and capacity of the shaft position transducer 3;
i=0, 1, 2 ... m−1 is the number of the stator winding 2 of the synchronous motor 1.

The modulus of the mean value $V_i$ of the voltage of the ith stator winding 2 of the synchronous motor 1 is formed by means of pulse-width modulation of the output voltage of the ith winding of the three-phase transformer 60.

The pulse-width modulation is effected by means of the switching units 41 of the control units 31, pulse-width modulators 9 and the controlled frequency divider 12.

The code $\Delta\phi$ from the output of the shaft position transducer 3 is applied to the address input 4 of the fixed memory 5. The output words of the fixed memory 5 recorded in the address $\Delta\phi$ includes three polarity setting codes $Y_i$ such as $$Y_i = \text{sign}\left[\frac{2\pi \cdot \Delta\phi}{2^d - 1}\right] + \frac{2}{3}\pi i \right) \quad (2)$$

where sign(x)=0 at x≧0 and sign(x)=1 at x<0.

The outputs 6 of the width code $X_i$ of the fixed memory 5 includes codes.

$$X_i = (2^p - 1)E \left| \sin\frac{2\pi \cdot \Delta\phi}{2^d - 1} + \frac{2}{3}\pi i \right) \right| \quad (3)$$

in which
p is the capacity of the pulse-width modulators 9;
E is the integral part of the expression in the brackets.

The codes $X_i$ from the outputs 6 of width setting codes of the contact memory 5 are applied to the code input of the substract binary counters 13 of the pulse-width modulators 9.

In each pulse-width modulator 9 the pulses with repetition frequency $f_s$ from the output of the pulse generator 20 are fed to the recording input 19 of the counter 13 and this results in leading of the code $X_i$ into the counter 13 so that the high-level signal is produced at the borrow output 16 of the counter 13. This signal is applied to the input 15 of the two-input and element 14 and permits passage of the output pulses with a frequency $f_u$ of the controlled frequency divider 12 from the two-input AND element 14, which is at the same time an input 10 of the pulse-width modulator 9 to the input 17 connected to the substract input 18 of the substract binary counter 13. Each pulse of the controlled frequency divider 12 fed to the substract input 18 of the counter 13 reduces its output code by "one" so that after the time, $$\tau = \frac{X_i}{f_u} \quad (4)$$

the output code of the counter 13 reduces to zero. When a regulator low-level pulse of the controlled frequency divider 12 is applied through the two-input AND element 14 to the substract input 18 of the counter 13, the signal at the borrow output 16 of the counter 13 takes a low level, which is fed to the input 15 of the two-input AND element 14. As a result of the process described the signal at the output 17 of the two-input AND element 14 and at the associated substract input 18 of the counter 13 has a low level regardless of the level of the controlled frequency divider 12 at the input of the two-input AND element 14, which is an input 10 of the pulse-width modulator 9. Thus, when the output code of the substract counter 13 attains a zero level and as soon as a regular low-level pulse from the output 11 of the controlled frequency divider 12 is applied to the input 10 of the pulse-width modulator 9, the signals at the substract input 18 and the borrow output 16 of the counter 13 take a low-level, which is preserved until a regular low-level pulse from the output of the pulse generator 20 is applied to the recording input 19 of the counter 13, then the above described process is repeated.

Therefore, the high-level pulses at the borrow output of the counter 13, which are output pulses of the pulse-width modulator 9, have a frequency $f_s$ and a pulse duty factor $$i = \frac{\tau}{\frac{1}{f_s}} = \frac{X_i \cdot f_s}{f_u} \quad (5)$$

From the expression (5) it follows that the pulse duty factor $\gamma_i$ of the ith pulse-width modulator 9 depends on the frequency $f_u$ of the output pulses of the controlled frequency divider 12. When the output code of the substract binary counter 21 of the controlled frequency divider 12 and when a regular low-level pulse from the output of the pulse generator 25 is applied to the substract input of the counter 21, which is at the same time a complementing input 24 of the controlled frequency divider 12, the signal at the borrow output 22 of the counter 21 and at the associated recording input takes a low level so that the code $\Delta g$ of the control signal modulus is sent from the control input 26 of the controlled frequency divider 12 to the counter 21. In this case the code at the outputs of the counter 21 take a value $\Delta g$, while the borrow signal becomes a high-level signal. Application of each low-level pulse from the pulse generator 25 to the substract input of the counter 21, which is at the same time a complementing input 24 of the controlled frequency divider 12, decreases the output code of the counter 21 by "one". After the time interval $$\tau_u = \Delta g \cdot \frac{1}{f_o} \quad (6)$$

where $f_o$ is the frequency of the pulse generator 25, the output code of the counter 21 is zero.

A regular low-level pulse transmitted from the output of the generator 25 to the substract input of the counter 21 gives rise to a low-level signal at the borrow output 22 and at the associated recording input 23 of the counter 21 so that the code $\Delta g$ is loaded in the counter 21 and the above described process is repeated. Thus the low-level pulses at the borrow output 22 of the counter 21 of the controlled frequency divider 12 have a width equal to the delay in propagation of the signal in the counter 21, and a frequency $$f_u = \frac{1}{\tau_u} = \frac{f_o}{\Delta g} \quad (7)$$

Since the borrow signal of the counter 21 is an output signal of the controlled frequency divider 12 and is fed to the complementing inputs 10 of the pulse-width modulators 9, the duty factor $\gamma_i$ of the output pulses of the ith pulse-width modulator 9 with account of (5) and (7) is $$\gamma_i = \frac{X_i \Delta g}{f_o} f_s \quad (8)$$

To provide the condition $\gamma_i = 1$ at maximum values of the codes $X_i = 2p - 1$ and $\Delta g = 2n - 1$, the frequency $f_s$ of the pulse generator 20 is selected from the condition $$f_s = \frac{f_o}{(2^p - 1)(2^n - 1)} \quad (9)$$

Taking into account (3), (8), (9), we obtain a final expression for the duty factor $\gamma_i$ of the output pulses of the ith pulse-width modulator 9:

$$\gamma_i = \frac{\Delta g}{2^p - 1} E \left| \sin\left( \frac{2\pi \cdot \Delta\phi}{2^d} + \frac{2}{3}\pi i \right) \right| \quad (10)$$

Thus the pulse-width modulators 9 together with the controlled frequency divider 12, the fixed memory 5 and the shaft position transducer 3 produce pulses whose duty factor $\gamma_i$ corresponds to the modulus of the mean voltage $V_i$ (1) of the stator windings 2 of the synchronous motor 1 required for perpendicularity of the vectors $\phi_s$, $\phi_r$ of the magnetic fields of the stator and rotor of the synchronous motor 1.

In accordance with (1), the required polarity of the voltage pulses on the stator windings 2 of the synchronous motor 1 is effected by the reverser 28, timer 67 and control units 31 together with the switching units 41. The signals A, B, C, D controlling the switching circuits 48–51 are applied respectively to the inputs 43, 44, 40, 42 of the ith switching unit 41 and are shaped by the ith control unit 31 on the basis of the output signals $e_i$, $h_i$, $s_i$, respectively, of the ith comparator 71, the ith pulse-width modulators 9 and the ith "exclusive OR" element 30 of the reverser 28. These signals are determined as follows. The output signal $e_i$ of the comparator 71 is equal to logical zero at a negative voltage at its input, which is at the same time an input 68 of the timer 67 and is equal to logical one in the opposite case. The value $h_i$ of the output signal of the pulse-width modulators 9 equal to one determines the connection of the ith winding 2 of the synchronous motor 1 to the ith winding of the transformer 60 by the switching circuits 48, 51 (or 49, 50); $h_i = 0$ corresponds to dynamic braking of the synchronous motor 1 by bridging the ith stator winding 2 of the synchronous motor 1 through the switching circuits 49, 51 (or 48, 50). The output signal at the output 33 of the reverser 28 determines a rise of the potential of the terminal 63 of the winding 2 of the synchronous motor 1 over the potential of the terminal 66 at $S_i = 0$ and the opposite situation at $S_i = 1$. The value of the signals A, B, C. D with the above described algorith for controlling the switching circuits 48–51 of the switching unit 41 for various $e_i$, $h_i$, $S_i$ are shown in Table 1, the "one" state of the signals A, B, C, D corresponding to the conductive state of the switching circuits 48–51 and vice versa.

TABLE 1

| Ordinal No. | $e_i$ | $h_i$ | $S_i$ | A | B | C | D |
|---|---|---|---|---|---|---|---|
| 1 | 0 | 0 | 0 | 0 | 1 | 0 | 1 |
| 2 | 0 | 0 | 1 | 1 | 0 | 1 | 0 |
| 3 | 0 | 1 | 0 | 1 | 0 | 0 | 1 |
| 4 | 0 | 1 | 1 | 0 | 1 | 1 | 0 |
| 5 | 1 | 0 | 0 | 1 | 0 | 1 | 0 |
| 6 | 1 | 0 | 1 | 0 | 1 | 0 | 1 |
| 7 | 1 | 1 | 0 | 0 | 1 | 1 | 0 |
| 8 | 1 | 1 | 1 | 1 | 0 | 0 | 1 |

The switching algorithm of the circuits 48–51 of the switching unit 41, accordance with Table 1, is described as follows.

With a passive value $h_i=0$ of the output signal of the pulse-width modulators 9, the stator windings 2 of the synchronous motor 1 are short circuited by the switching circuits 48, 50 (at $S_i=0$) or by the switching circuits 48 ... 51 (at $S_i=1$), i.e. dynamic braking of the synchronous motor 1 is effected. With an active value $h_i=1$ of the output signal of the pulse-width modulators 9 and coincidence of the polarity of the voltage determined by the output signal $1_i$ of the comparator 71 and the preset polarity of the voltage supply on the stator windings 2 of the synchronous motor 1 determined by the signal $S_i$ at the output of the "exclusive OR" element 30, the windings 2 of the synchronous motor 1 are connected through their terminals 63, 66 to the terminals of the windings of the transformer 60 through the switching circuits 48, 51. When the condition $e_i = S_i$ is not observed, the terminals 63, 66 of the windings 2 of the synchronous motor 1 are connected respectively to the terminals 59, 58 of the transformer 60 through the switching circuits 49, 50. Thus, if the polarity of the power supply network is not coincident with the polarity on the winding 2 of the synchronous motor 1, the switching circuits 48–51 make inverse connection of the stator windings 2 of the synchronous motor 1 to the windings of the transformer 60.

Therefore, with an active value $h_1=1$ of the output signal of the pulse-width modulators 9, the polarity of the voltage on the windings 2 of the synchronous motor 1 corresponds to the preset polarity regardless of the polarity of the supply network. The minimized logical expressions for the signals A,B,C,D controlling the switching circuits 48–51 of the switching unit 41, in accordance with Table 1 are written as follows:

$$A = e_i \oplus (S_i + h_i)$$
$$B = \overline{e_i \oplus (S_i + h_i)} = \bar{A} \quad (11)$$
$$C = e_i \oplus S_i$$
$$D = \overline{e_i \oplus S_i} = \bar{C}$$

In the control units 31 realizing the algorithm (11) of switching of the circuits 48–51, "exclusive OR" elements 35, 36 are used for shaping the signal A, the inverter 38 is used for shaping the signal B, the "exclusive OR" element 37 is used for shaping the signal C and the inverter 39 is used for shaping the signal D.

The output signals Si of the reverser 28 are shaped by the "exclusive OR" elements 30 according to the expression $$S_i = \text{sign}\Delta g \oplus Y_i \quad (12)$$

Thus, the signals $S_i$ are repetition of the polarity setting signals $Y_i$ at sign $\Delta g = 0$ and their inversion at sign $\Delta g = 1$. Therefore, in the case of changeover of the control signal polarity setting signal sign $\Delta g$ from 0 to 1, the polarity setting signals are inverted resulting in a change in the polarity of the voltage on all windings 2 of the synchronous motor 1 and this, in turn, changes the direction of the vector of the stator magnetic field in the synchronous motor 1 (while preserving its modulus and perpendicularity to the rotor field). Thus, when switching the signal sign $\Delta g$ from 0 to 1, the torque of the synchronous motor 1 changes its polarity while the magnitude of this torque remains the same, and this determines the electric drive reverse.

In accordance with the above described algorithm of operation of the control unit 31, the polarity of the voltage on the winding 2 of the synchronous motor 1 is determined by the output signal $S_i$ of the "exclusive OR" element 30 of the reverser 28 and is independent of the polarity of the a.c. voltage on the terminals 58, 59 of the ith winding of the three-phase transformer 60. The rectifier in the claimed gate-controlled electric drive is in fact the switching unit 41 based on bidirectional switching circuits 48–51. As an example, let us discuss the operation of the switching circuit 48, since the remaining switching circuits 49–51 operate in a similar manner.

When the switching circuit 48 (FIG. 3) is used for controlling the levels of the transistor-transistor logics and when the voltage $+E_3$ of the second source of positive polarity is equal to the power supply voltage of the "exclusive OR" elements 35–37 (FIG. 1) of the invertors 38, 39 of the control unit 31, the logical "one" signal applied to the input 43 of the switching unit 41, which is a control input of the switching circuit 48, renders the transistors 89, 91 (FIG. 3) nonconductive. The voltage $+E_2$ of the first source of positive polarity voltage is selected from the condition $$+E_2 \geq \max |V_k - V_B| + V_p + \sqrt{\frac{\max |V_k - V_B|}{R \cdot k}} \quad (13)$$

where $V_p$ is the threshold voltage of the transistor 81;
R is the resistance of the winding 2 of the synchronous motor 1;
k is the amplification factor of the transistor 81;
$V_k$ and $V_B$ are the voltages to be switched.

When the voltage $+E_2$ is selected in accordance with (13) regardless of the value of the switched voltages $V_k$, $V_B$, a breakdown of the zener diode 83 takes place, and a voltage $V_T$ is applied to the gate of the transistor 81 with the n-type induced channel. This voltage is measured relative to the other transistor terminal (drain or source), which at this moment is at a lower potential, and is described by the formula $$V_T = V_o + V_d \quad (14)$$

where $V_o$ is the breakdown voltage of the zener diode 83;
$V_d$ is the voltage drop across the diodes 84, 85 connected in the forward direction.

Due to the symmetry of the drain and source of the transistor 81 the voltage $V_T$ is applied to the gate relative to the source at $V_k > V_B$ and relative to the drain in the opposite case. The connection of the anode of the zener diode 83 to the drain or source of the transistor 81, having at this moment a higher potential, is effected by means of diodes 84, 85 and resistors 86, 87. The breakdown voltage $V_o$ of the zener diode 83 is applied at $V_k > V_B$ to the gate of the transistor 81 relative to the source through a diode, which is rendered conductive by the current flowing from the terminal 52 of the switching circuit 48 to the terminal 61 through a resistor 86. At $V_B > V_k$ the voltage $V_o$ is applied to the gate of the transistor 81 relative to its drain through the diode 84 rendered conductive by the current flowing through a resistor 87 from the terminal 61 to the terminal 52 of the switching circuit 48.

The resistance of the resistors 86, 87 are chosen to be much higher than the resistance R of the winding 2 of the synchronous motor 1 so that the effect of the leakage currents through the resistors 86, 87 on the output voltage of the switching circuit 48 is negligible.

Since, due to the above described processes, the voltage of the gate of the transistor 81 relative to the terminal (drain or source) having a lower potential is sufficient for shifting the operating point of the transistor 81 to the linear portion of the current-voltage characteristic, the resistance of the channel of the transistor 81 drops down to a very low value and this is equivalent to the conducting state of the switching circuit 48, in which case the current can flow through the switching circuit 48 in any direction.

When a logical zero signal is applied to the input 43, the transistors 91, 89 are rendered conductive and the potential of the transistor 89 drops down practically to a value $-E_1$. Since the voltage $-E_1$ of the negative polarity voltage source is selected from the condition $$-E_1 < \min\{V_k, V_B\}, \tag{15}$$

regardless of the values of the voltages $V_k$, $V_B$, the diode 88 is rendered nonconductive, and the gate of the transistor 81 is connected through the resistor 82 and one of the diodes 84, 85 to a terminal (drain or source) of the transistor 81 having a lower potential. In this case $V_l = V_d < V_p$ so that the resistance of the channel of the transistor 81 increases considerably, and this is equivalent to the non-conductive state of the switching circuit 48.

The above discussed bidirectional switching circuit 48 is controlled by logical signals and this makes it possible to combine functions of a switch and a rectifier.

Thus, in the claimed gate-controlled electric drive the formation of a required magnetic field of the stator and mutual orientation of the magnetic field of the stator and rotor of the synchronous motor 1 is effected by means of pulse-width modulation of the a.c. voltage at the terminals 58, 59 of the windings of the three-phase transformer 60. The modulus of the mean voltage on the windings 2 of the synchronous motor 1 is formed by the pulse-width modulators 9 and the controlled frequency divider 12 on the basis of the output data of the shaft position transducer 3 and the pulse width codes of the fixed memory 5. The required polarity of the mean voltage on the windings 2 of the synchronous motor 1 is provided by the control units 31 and switching units 41 on the basis of the signals from the reverser 28 and timer 67 analyzing respectively the polarity setting codes of the fixed memory 5, the polarity sign $\Delta g$ of the control signal, and the current polarity of the voltages on the terminals 58-59 of the windings of the three-phase transformer 60.

The claimed gate-controlled electric drive provides in the average per period of power supply voltage perpendicularity of the magnetic fields of the stator and rotor of the synchronous motor 1 and control of the amplitude and polarity of the stator field by means of the codes of the modulus $\Delta g$ and the polarity sign $\Delta g$ of the control signal. This electric drive can be used with synchronous motors whose electromechanical time constant is much longer than the period of the a.c. voltage of the power supply mains.

When low-inertia synchronous motors are used and strict limitations are imposed on the torque fluctuation, it is expedient to employ the gate-controlled electric drive shown in FIG. 2.

The pulse-width modulators 9, controlled frequency divider 12, reverser 28 and switching unit 41 used in this drive operate as described above.

In this drive the ripple of the total magnetic field of the stator produced by all windings 2 of the synchronous motor 1 is compensated. A decrease in the stator magnetic field caused by a decrease of the current value of the a.c. supply voltage of one of the windings 2 is compensated by an increase of the duty factor $\gamma_i$ of the pulses of the pulse-width modulators 9 of the other windings 2 whose supply voltage at this instant of time is high enough, in accordance with the modulator law:

$$\gamma_i = \frac{\Delta g}{2^n - 1} \left| \sin\left( 2\pi \left[ \frac{\Delta k}{2^l - 1} + \frac{\Delta \phi}{2^m - 1} + \frac{1 - 2^i}{3} \right] \right) \right| \tag{16}$$

where
$\Delta k$ is the code of the current phase of the mains formed by the timer 67;
$l$ is the capacity of the counter 75.

The code $\Delta k$ is formed by means of the summary counter 75 counting the pulses of the generator 73 fed to the complementing input 74 of the counter 75. The counter 75 is reset by the leading edge of the output signal of the comparator 77 whose output is connected to the reset input 76 of the counter 75. Since the comparator 77 shaped square pulses with the same period from the sine wave voltage at the terminal 58 of the winding of the three-phase transformer 60, the counter 75 is reset as soon as the current phase of the mains voltage approaches zero, in which case a change of the phase of the mains voltage from 0 to 2 results in a change of the output code $\Delta k$ of the counter 75 from 0 to $2^l-1$, which is attained by a proper selection of the frequency $f_1$ of the pulse generator 73:

$$f_l = \frac{f_c}{2^l} \tag{17}$$

where $f_c$ is the mains frequency.

The code $\Delta k$ from the output of the counter 75 of the timer 67 and the code $\Delta \phi$ of the angle of turn of the rotor of the synchronous motor 1 from the output of the shaft position transducer 3 are applied respectively to the inputs 72 and 4 of the fixed memory 5. Thus the input address $\Delta a$ of the fixed memory 5 is formed by summing up (with a respective weighting factor) the code $\Delta \phi$ of the shaft position transducer 3 and the code $\Delta k$ of current phase of the mains formed by the counter 75 of the timer 67 and this address is $$\Delta a = \Delta \phi + 2^d \cdot \Delta k \tag{18}$$

The output word of the fixed memory 5 located at the address $\Delta a$ comprises three polarity setting codes $Y_i$ of the type $$Y_i = \text{sign}\left\{ \sin\left[ \left( 2\pi \frac{\Delta k}{2^l - 1} + \frac{2 - i}{3} \right) \right] \sin \tag{19}$$

$$\left( 2\pi \left[ \frac{\Delta k}{2^l - 1} + \frac{\Delta \phi}{2^d - 1} + \frac{1 - 2i}{3} \right] \right) \right\}$$

The width code $X_i$ setting outputs of the fixed memory 5 in the embodiment under discussion include codes $$\gamma_i = \frac{\Delta g}{2^n - 1} E \left| \sin \left( 2\pi \left[ \frac{\Delta k}{2^e - 1} + \frac{\Delta \phi}{2^d - 1} + \frac{1 - 2i}{3} \right] \right) \right| \quad (20)$$

The pulse-width modulators 9 and the controlled frequency divider 12 convert the codes $X_i$ into pulses with a duty factor $$\gamma_i = \frac{\Delta g}{2^n - 1} E \left| \sin \left( 2\pi \left[ \frac{\Delta k}{2^e - 1} + \frac{\Delta \phi}{2^d - 1} \frac{1 - 2i}{3} \right] \right) \right| \quad (21)$$

The formation of required polarity of the voltage pulses on the stator windings 2 of the synchronous motor 1 is effected by the reverser 28 and control units 31 jointly with the switching units 41. The signals B,A,D,C controlling the switching circuits 48-51 of the ith switching unit 41 are shaped by the ith control unit 31 on the basis of the output signals $h_i$ of the ith pulse-width modulator 9 and $S_i$ of the ith "exclusive OR" element 30 of the reverser 28. The values of the signals A,B,C,D for various $h_i$, $S_i$ are given in Table 2.

TABLE 2

| $h_i$ | $S_i$ | B | A | D | C |
|---|---|---|---|---|---|
| 0 | 0 | 0 | 1 | 0 | 1 |
| 0 | 1 | 1 | 0 | 1 | 0 |
| 1 | 0 | 0 | 1 | 1 | 0 |
| 1 | 1 | 1 | 0 | 0 | 1 |

In accordance with Table 2, the minimized expressions for the signals B,A,D,C controlling the switching circuits 48-51 of the switching unit 41 are written as $$B = S_i$$

$$A = \overline{S_i}$$

$$D = h_i \oplus S_i \quad (22)$$

$$C = \overline{h_i \oplus S_i}$$

The signal C is shaped by the "exclusive OR" element 80 of the control unit 31, while the signals D and B are shaped by the inverters 78, 79 respectively.

Required polarity of the voltage pulses on the windings 2 of the synchronous motor 1 in this embodiment is provided by the control units 31 on the basis of the information sent through the reverser 28 from the outputs 7 of the fixed memory 5. The codes $Y_i$ fed to the reverser 28 from the outputs 7 of the fixed memory 5 include information on the current polarity of the voltage of all phases of the mains, because these polarities are uniquely associated with the code $\Delta k$ of the current phase of the mains sent from the output of the counter 75 of the timer 67 to the address input 72 of the fixed memory 5.

Thus, a predetermined value of the torque of the synchronous motor 1 is effected in the given gate-controlled electric drive by controlling the amplitude of the stator field while accurately keeping the perpendicularity of the vectors of the magnetic fields of the stator and rotor of the sunchronous motor 1. The perpendicularity of the vectors of said fields is maintained by means of pulse-width multiplication of the voltage of the corresponding phase of the mains by a correction function whose modulus and polarity are determined, respectively, by the codes $X_i$ and $Y_i$ sent from the outputs 6, 7 of the fixed memory 5.

Figure 4A:
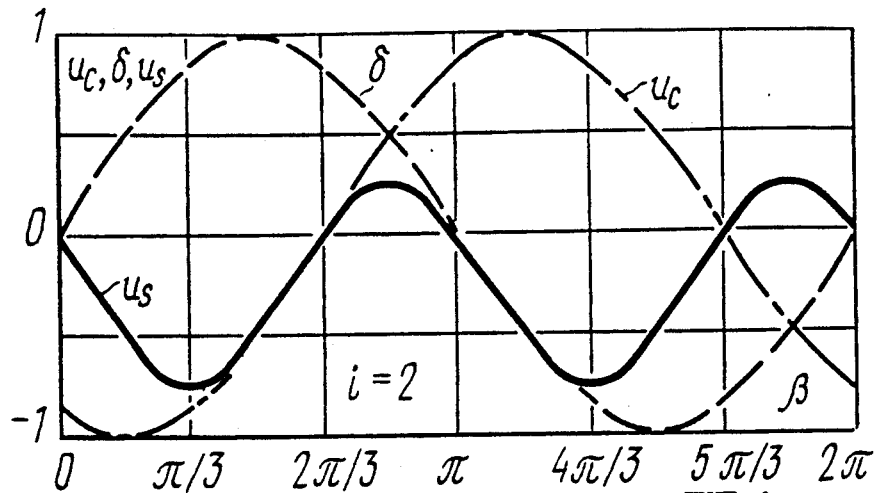
FIG. 4 are graphs illustrating the dependence of the rated mains voltage, the correction function and the normalized average value of the voltage on the stator windings of the synchronous motor on the current phase of the mains voltage.
Figure 4B:
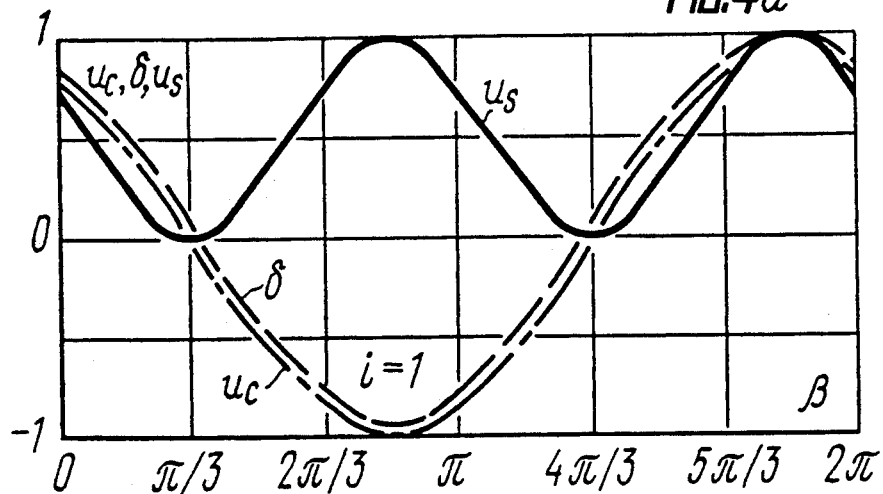
Figure 4C:
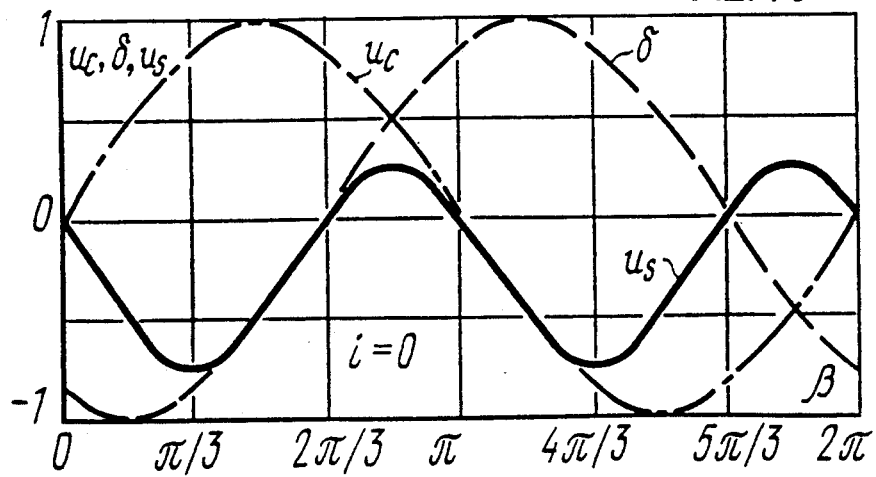

Shown in FIG. 4 (a,b,c) are graphs of the normalized mains voltage $u_c$, the correction function $\delta_o$ and the normalized mean value $u_s$ of the voltage as functions of the current phase $\beta$ of the mains voltage on three stator windings 2 of the synchronous motor 1 with numbers of the phases i=2,1,0 denoted respectively by a dot-and-dash line, a dash line and a continuous line. These graphs are plotted on the basis of the expressions (19) to (21) with $\Delta \phi = 0$ and a change of the phase of the mains from 0 to 2 (i.e. a change of $\Delta k$ from 0 to 2-1).

The comparator 77 of the timer 67 in this embodiment of the invention is connected to the phase i=0 of the mains, while the numbers i of the other two phases are selected so that when increasing the number i of the phase by one unity, the phase shift of the voltage of the given phase with respect to the preceding phase is reduced by 120 degrees.

Figure 5:
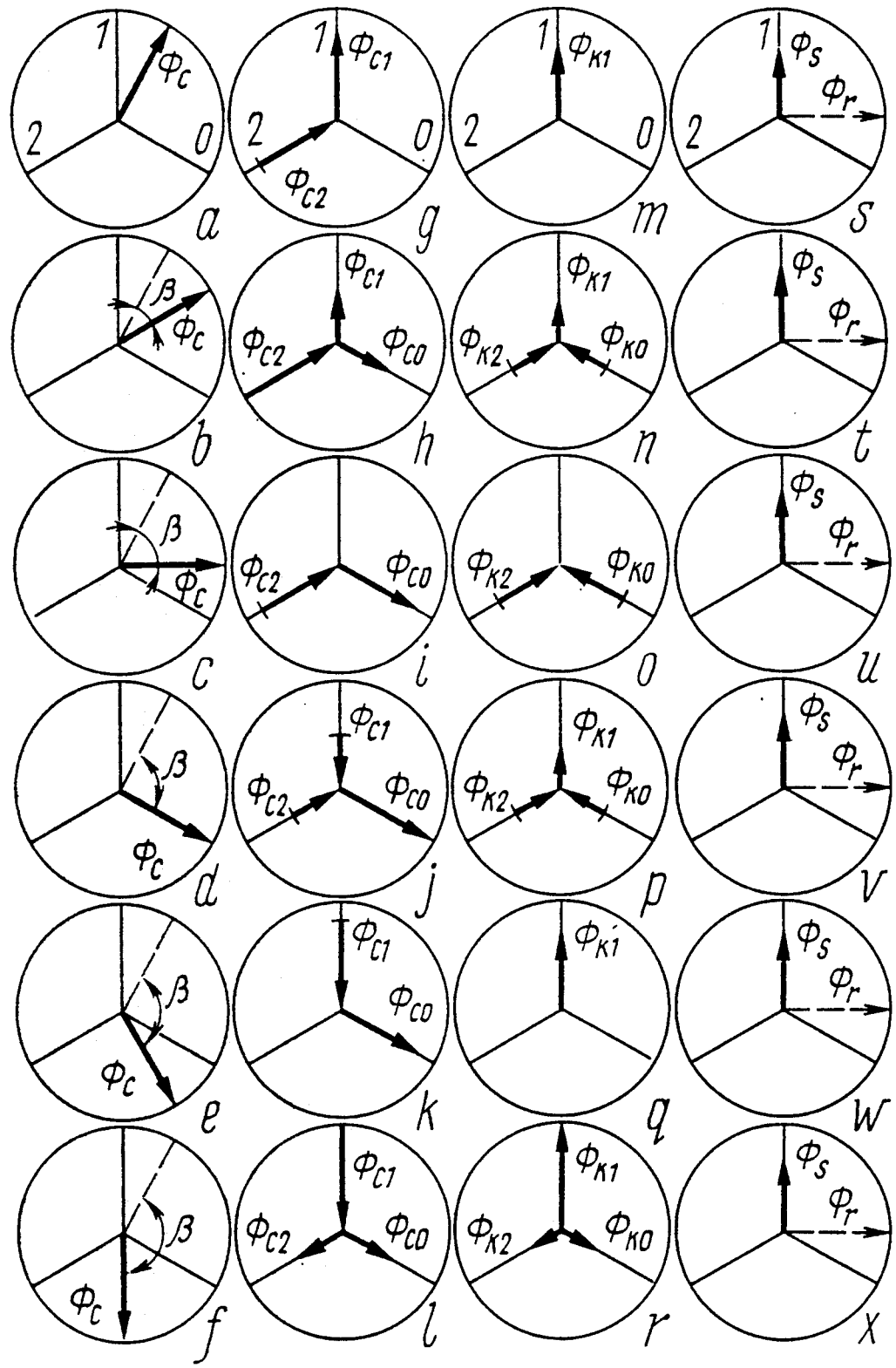
FIG. 5 shows vector diagrams of the magnetic fields of the synchronous motor.

The vector diagrams plotted in accordance with FIG. 4(a,b,c) are given in FIG. 5. In the diagrams a-f the vector $\phi_c$ of the magnetic field produced when the windings 2 of the synchronous motor 1 having numbers i=0,1,2 is reduced by a factor of $\sqrt{3/2}$ for picture convenience. The diagrams g-l show projections $\phi_{ci}$ of the vector $\phi_c$ of the magnetic field on the axis of the ith windings 2 of the synchronous motor 1, said projections corresponding to the ith phase voltage $u_c$ of the mains; the diagrams m-r show the vectors $\phi_{ki}$ of the magnetic fields produced by the stator windings 2 fed with voltage obtained by multiplying the mains voltage by the correction function $\delta_o$; the diagrams s-x show the resultant vector $\phi_s$ of the stator magnetic field and the vector $\phi_r$ of the magnetic field of the rotor of the synchronous motor 1 (this vector is shown by a dash line).

In this diagrams a-f; m-r; s-x (FIG. 5) the current phase of the mains voltage increases with a step $\pi/6$ from 0 to 5 $\pi/6$, the value $\beta = 0$ corresponding to the zero value of the phase voltage with a number i=0, i.e. to the perpendicularity of the field $\phi_c$ and the axis of the winding 5 with a numeral i=0.

The analysis of the above described diagrams allows us to draw a conclusion that the claimed gate-controlled electric drive makes it possible to provide a constant amplitude of the vector $\phi_s$ and perpendicularity of the vectors $\phi_s$ of the stator magnetic field shown by a dash line in FIG. 5 (diagrams s-x) of the rotor magnetic field $\phi_r$ in spite of fluctuation of the voltage on the stator windings 2 of the synchronous motor 1 due to the harmonic character of the supply voltage $\phi_{ki}$ fed through the switching units 41.

The constant amplitude of the stator magnetic field $\phi_s$ and proper mutual orientation of the fields $\phi_s$ and $\phi_r$, i.e. compensation of the torque fluctuation caused by the mains power supply is obtained in the claimed drive by increasing (in accordance with the expression 20) of the duty factor $\gamma_i$ of the power supply pulses of the two stator windings 2 of the synchronous motor 1 while reducing the power supply voltage of the third winding 2 so that the summary magnetic field $\phi_s$ of the stator produced by all windings 2 has an amplitude and angular position determined by the code $\Delta g$ of the control signal and the code $\Delta \phi$ of the angle of turn of the rotor of the synchronous motor 1.

Thus, the gate-controlled electric drive considered above ensures constancy of the torque in the case of power supply directly from a-c mains.

Industrial Applicability

The present invention can be used in various slave mechanisms including electromechanical robots and CNC machine tools, in telemechanics and instrument transducers.

We claim:

1. A gate-controlled electric drive comprising a synchronous motor having a plurality of windings; a shaft position transducer connected to said synchronous motor and having an output; a permanent memory storing width and polarity codes of power supply pulses of the windings of said synchronous motor and having an address input connected to said output of said shaft position transducer and having a plurality of outputs for setting width codes and a plurality of outputs for setting polarity codes; a plurality of pulse-width modulators, each pulse-width modulator having an input connected to a respective output for setting width codes of said memory and having a complementing input and an output; a controlled frequency divider having a control input receiving a control signal modulus code, a complementing input and an output connected to said complementing input of said pulse-width modulators; a first pulse generator having an output connected to said complementing input of said controlled frequency divider; a reverser having a control input receiving a control signal polarity code, inputs connected to respective outputs for setting polarity codes of said memory and outputs; a plurality of control units, each control unit having a control input connected to said output of a corresponding pulse-width modulator, a polarity setting input connecting to a corresponding output of the reverser, a polarity correction input and a plurality of outputs; a plurality of switching units, each switching unit having a power input, an input connected to a respective output of a respective control unit, and an output connected to a respective winding of said synchronous motor, and each switching unit including bi-directional switches connected in a bridge circuit; an m-phase transformer connected to a.c. m-phase means, output windings of said transformer being connected to said power inputs of respective switching units; and a timer connected to said m-phase transformer and to said polarity correction inputs of said control units.

2. A gate-controlled electric drive according to claim 1, wherein the reverser comprises a plurality of "exclusive OR" elements, each exclusive OR element having a first input which is one of said inputs of said reverser and an output which is one of said outputs of said reverser, and second inputs of said exclusive OR gates being interconnected and serving as said control input of said reverser.

3. A gate-controlled electric drive according to either of claims 1 or 2, wherein
said timer comprises a plurality of comparators, each of said comparators having a first input connected directly to a respective output winding of said m-phase transformer, second inputs of said comparators being grounded and outputs of said comparators serving as said outputs of said timer; and wherein
each control unit comprises a first exclusive OR element having a first input serving as said control input of the control unit, a second input serving as said polarity setting input of the control unit, and an output; a second exclusive OR element having a first input connected to said output of said first exclusive OR element, a second input connected to said polarity correction input of said control unit, and an output; a third exclusive OR element having a first input connected to said second input of said second exclusive OR element and serving as said polarity correction input of said control unit, a second input connected to said second input of said first exclusive OR element and serving a said polarity setting input of said control unit and an output serving as one of said outputs of said control unit; a first inverter having an input connected to said output of said second exclusive OR element and an output serving as one of said outputs of said control unit; and as second inverter having an input connected to said output of said third exclusive OR element and an output serving as one of said outputs of said control unit.

4. A gate-controlled electric drive according to either of claims 1 or 2, wherein
the timer comprises a pulse generator having an output; a counter having a complementing input connected to said output of said pulse generator, a reset input and an output connected to a second address input of said memory; and a comparator having a first input connected to one of said output windings of said m-phase transformer, a second input that is grounded and an output connected to said reset input of said counter; and wherein
each control unit comprises an exclusive OR element having a first input serving as said control input of said control unit, a second input serving as said polarity setting input of said control unit and an output serving as one of said outputs of said control unit; a first inverter having an input connected to said second input of said second exclusive OR element and serving as said polarity setting input of said control unit and an output serving as one of said outputs of said control unit; and a second inverter having an input connected to said output of said exclusive OR element and an output serving as one of said outputs of said control element.

5. A gate-controlled electric drive according to either of claims 1 or 2 wherein each bi-directional switch of each switching unit comprises a metal-insulator-semiconductor transistor with an n-type induced channel and having a drain and a source serving as terminals of said bi-directional switch, and also having a substrate and a gate; a first resistor connected to said substrate and said gate of said metal-insulator-semiconductor transistor; a zener diode having a cathode connected to said gate of said metal-insulator-semiconductor transistor and an anode connected to said substrate of the metal-insulator-semiconductor transistor; first and second diodes having anodes connected to the substrate of said metal-insulator-semiconductor transistor and cathodes connected, respectively, to the said drain and said source of the metal-insulator-semiconductor transistor; second and third resistors connected in parallel with said first and second diodes, respectively; a third diode having a cathode connected to said gate of the metalinsulator-semiconductor transistor and having an anode; a bi-polar n-p-n transistor having a collector connected to said anode of the third diode, an emitter connected to a negative-polarity d.c. voltage source and a base; a fourth resistor connected to said collector of the n-p-n transistor and to said anode of said third diode and to a first positive-polarity d.c. voltage source; a bipolar p-n-p transistor having an emitter connected to a second positive polarity d.c. voltage source, a collector and a base; a fifth resistor connected to the collector of said p-n-p transistor and to the base of said n-p-n transistor; a sixth resistor connected to said collector of said p-n-p transistor and to the emitter of said n-p-n transistor; and a seventh resistor connected to the base of said p-n-p transistor and to a terminal of said switching unit.

6. A gate-controlled electric drive according to claim 3 wherein each bi-directional switch of each switching unit comprises a metal-insulator-semiconductor transistor with an n-type induced channel and having a drain and a source serving as terminals of said bi-directional switch, and also having a substrate and a gate; a first resistor connected to said substrate and said gate of said metal-insulator-semiconductor transistor; a zener diode having a cathode connected to said gate of said metal-insulator-semiconductor transistor and an anode connected to said substrate of the metal-insulator-semiconductor transistor; first and second diodes having anodes connected to the substrate of said metal-insulator-semiconductor transistor and cathodes connected, respectively, to the said drain and said source of the metal-insulator-semiconductor transistor; second and third resistors connected in parallel with said first and second diodes, respectively; a third diode having a cathode connected to said gate of the metal-insulator semiconductor transistor and having an anode; a bi-polar n-p-n transistor having a collector connected to said anode of the third diode, an emitter connected to a negative-polarity d.c. voltage source and a base; a fourth resistor connected to said collector of the n-p-n transistor and to said anode of said third diode and to a first positive-polarity d.c. voltage source; a bipolar p-n-p transistor having an emitter connected to a second positive polarity d.c. voltage source, a collector and a base; a fifth resistor connected to the collector of said p-n-p transistor and to the base of said n-p-n transistor; a sixth resistor connected to said collector of said p-n-p transistor and to the emitter of said n-p-n transistor; and a seventh resistor connected to the base of said p-n-p transistor and to a terminal of said switching unit.

7. A gate-controlled electric drive according to claim 4 wherein each bi-directional switch of each switching unit comprises a metal-insulator-semiconductor transistor with an n-type induced channel and having a drain and a source serving as terminals of said bi-directional switch, and also having a substrate and a gate; a first resistor connected to said substrate and said gate of said metal-insulator-semiconductor transistor; a zener diode having a cathode connected to said gate of said metal-insulator-semiconductor transistor and an anode connected to said substrate of the metal-insulator-semiconductor transistor; first and second diodes having anodes connected to the substrate of said metal-insulator-semiconductor transistor and cathodes connected, respectively, to the said drain and said source of the metal-insulator-semiconductor transistor; second and third resistors connected in parallel with said first and second diodes, respectively; a third diode having a cathode connected to said gate of the metal-insulator-semiconductor transistor and having an anode; a bi-polar n-p-n transistor having a collector connected to said anode of the third diode, an emitter connected to a negative-polarity d.c. voltage source and a base; a fourth resistor connected to said collector of the n-p-n transistor and to said anode of said third diode and to a first positive-polarity d.c. voltage source; a bipolar p-n-p transistor having an emitter connected to a second positive polarity d.c. voltage source, a collector and a base; a fifth resistor connected to the collector of said p-n-p transistor and to the base of said n-p-n transistor; a sixth resistor connected to said collector of said p-n-p transistor and to the emitter of said n-p-n transistor; and a seventh resistor connected to the base of said p-n-p transistor and to a terminal of said switching unit.

* * * * *